(12) United States Patent
Miller

(10) Patent No.: US 6,592,793 B1
(45) Date of Patent: Jul. 15, 2003

(54) APPARATUS AND METHOD FOR EXTRUDING PENCILS

(75) Inventor: Edward James Douglas Miller, London (GB)

(73) Assignee: Remarkable Pencils Limited, London (GB)

( * ) Notice: Subject to any disclaimer, the term of this patent is extended or adjusted under 35 U.S.C. 154(b) by 0 days.

(21) Appl. No.: 09/615,721

(22) Filed: Jul. 13, 2000

(30) Foreign Application Priority Data

Jul. 14, 1999 (GB) .............................................. 9916461

(51) Int. Cl.⁷ ............................................. B29C 47/92
(52) U.S. Cl. ................................ 264/171.13; 264/40.7; 264/46.1; 264/54; 425/140; 425/325
(58) Field of Search .................... 264/40.7, 54, 171.13, 264/46.1; 425/140, 325

(56) References Cited

U.S. PATENT DOCUMENTS 3,704,071 A * 11/1972 Muller et al. ................. 401/96
3,983,195 A    9/1976 Arons et al.
4,439,125 A *  3/1984 Dieckmann et al. ....... 264/40.7
4,776,998 A * 10/1988 Davidson et al. .......... 264/40.7
5,531,947 A    7/1996 Metzger et al.
5,756,030 A    5/1998 Cykana et al.

FOREIGN PATENT DOCUMENTS

| DE | 3706189 A1 | 9/1988 |
| DE | 4230792 A1 | 3/1994 |
| JP | 7276471 | 10/1995 |

* cited by examiner

*Primary Examiner*—Allan R. Kuhns
(74) *Attorney, Agent, or Firm*—Young & Thompson

(57) ABSTRACT

An apparatus for extruding pencils and a method of using the apparatus. A core material (6) is extruded from an extruder (1) and forms a catenary loop in a cooling zone (4). The core material is carefully cooled at ambient temperature before being cooled and straightened at a cooling unit (5). The core material is coated in a crosshead and die assembly (8) with sheath material extruded from extruder (10). In a further cooling zone (12) the sheath material expands under the action of a blowing agent and the extrudate is sized by a calibrator (13).

3 Claims, 2 Drawing Sheets

APPARATUS AND METHOD FOR EXTRUDING PENCILS

The invention relates to apparatus for extruding and in particular to an apparatus and method for extruding pencils from synthetic materials such as plastics.

Wood substitute materials have been known for many years and generally comprise a foamed thermoplastic such as polystyrene containing fillers for colouring and fibrous fillers to provide texture. Such materials are also known for use as sheath materials for pencils. For example U.S. Pat. No. 3,993,408 discloses pencils made with a resin-based sheath consisting essentially of a resin binder, a fibrous filler and a metallic soap. The material is extruded around a lead or marking core. The core material is a traditional ceramic. The extrusion process comprises pre-heating the core material to approximate the temperature of the molten sheath material that is coated onto the core in a crosshead die of conventional construction. The extrudate is chilled and then cut once cooled.

The main problems with using substitute materials for pencils are in providing the correct properties. Pencils must be easily sharpened and whether this is possible depends on how hard the sheath material is and also, because of the impacting torsion, on how brittle the lead is; it also depends on the adhesion between the lead and the sheath. The lead must be of constant thickness and the manufacturing process must not introduce variations in tensions or show any fractures.

GB-A-1363161 gives suitable synthetic compositions for pencil casings. The composition is a polystyrene, polyethylene and glass fibre composition together with blowing agents, say, 0.2–1.5%. The synthetic pencils have the required sharpenability together with a flexural modulus greater than 30000 Kg/cm$^2$.

Pencils are made increasingly of synthetic materials, whereby profiles are extruded and subsequently cut to the length of a pencil. The binding material and the coating material (sheath) use various polymer materials but SAN and ABS polymers have previously been preferred.

In U.S. Pat. No. 5,531,947 a polymer binding material is melted in a lead extruder in order to manufacture a synthetic lead. In a loading extruder a mixture of additives is added to the melted polymer material, including colours, gliders and adhesive substances. A substitute lead is extruded and cooled in a first cooling range to the point where, upon entering the coating nozzle the 'lead' is no longer molten but is not completely cold. In a coating extruder the coating materials are introduced for the formation of the pencil coating or sheath. The lead extruder includes first and second loading stations a melting and transportation range and a mixing and kneading range downstream of the second loading station. First and second cooling ranges lie between the lead extruder and the coating nozzle and downstream of the coating nozzle respectively.

U.S. Pat. No. 3,936,519, discloses apparatus for extruding a lead pencil in which the lead is securely bonded to a sheath formed from foamed plastic material.

It is an object of the present invention to provide an improved extrusion process and apparatus for manufacturing pencils and the like. It is also desirable as much as possible to recycle materials such as plastics. More particularly where the 'lead' uses recycled plastics such as polystyrene, the extrusion process becomes very difficult to implement because of the poor physical properties of the extruded recycled material. It is, therefore, another object of the present invention to provide a process and apparatus to allow extrusion and coating of materials such as recycled polystyrene which have poor physical properties.

Accordingly, the present invention provides apparatus for manufacturing pencils comprising a core material extruder, a sheath material extruder, a crosshead and die assembly for coating the sheath material onto the core material, and a means for sizing the extrudate from the crosshead die, the sizing means is separated from the face of the crosshead die by a predetermined distance to provide a cooling zone in which the extrudate is allowed to cool at ambient temperature, the apparatus comprises means for maintaining the length of the extrudate in said cooling zone between a minimum and a maximum length and sensors for detecting when the length of the extrudate reaches either said minimum or maximum length. The apparatus of the invention allows the manufacture of pencils using synthetic materials even when these are unconventional materials or materials having less than optimum properties, for instance recycled materials. In the cooling zone the sheath material is allowed to expand and the adhesion between the core and sheath are thereby improved.

The apparatus may further comprise a cooling unit between said core extruder and said crosshead and die assembly, the cooling unit being separated from the core material extruder by a predetermined distance providing a second cooling zone in which the extrudate from the core material extruder is allowed to cool at ambient temperature.

The invention further provides a method for extruding pencils having a core and a sheath, comprising loading the core and sheath materials into respective extruders, cooling the core material and coating the sheath material onto the core material in a crosshead and die assembly, cooling the extrudate from the crosshead and die assembly and sizing the extrudate to a predetermined diameter in a sizing means, the step of cooling comprises allowing the extrudate to cool at ambient temperature and maintaining the length of extrudate in a cooling zone between an outlet of said crosshead and die assembly and said sizing means between minimum and maximum lengths. In the cooling zone the sheath material is allowed to expand and the adhesion between the core and sheath are thereby improved.

The extruded sheath material preferably comprises an endothermic blowing or foaming agent.

The core material may be initially allowed to cool at ambient temperature before cooling in a cooling unit to provide a rigid and straight core material to be fed into the crosshead and die assembly.

The invention will now be described in more detail and by way of example only, with reference to the accompanying drawings, in which.

Figure 1:
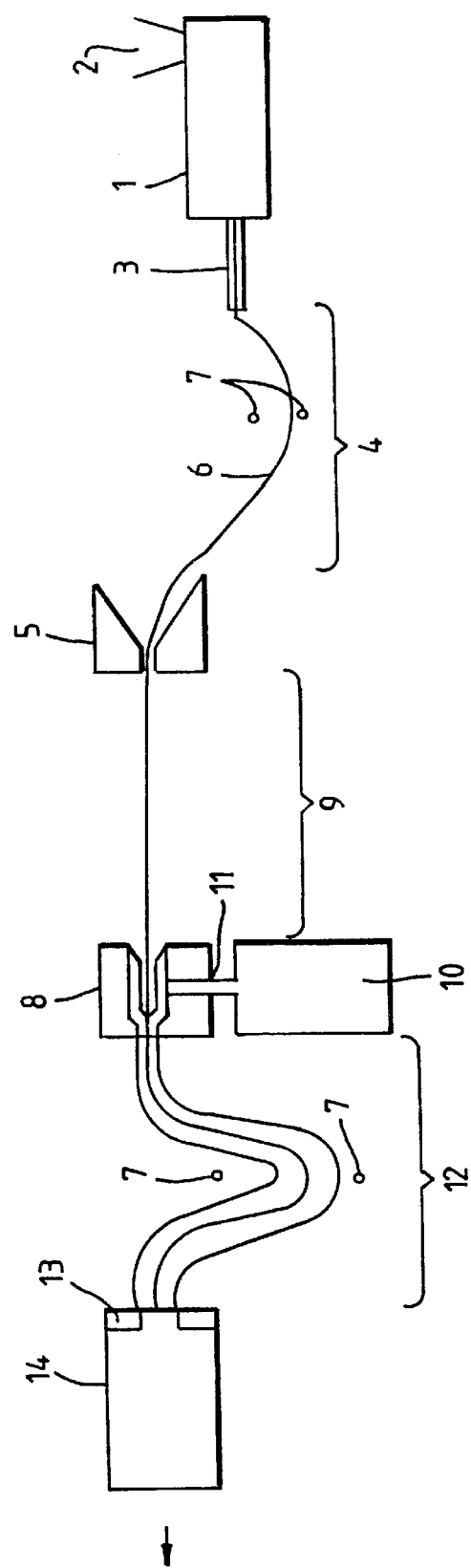
FIG. 1 is a simplified schematic drawing of elements of extrusion apparatus according to the invention.

Referring now to FIG. 1, the apparatus comprises an extruder 1 of a conventional type and having an inlet hopper 2 at one end. An outlet end of the extruder is connected to an extruder die 3 shown in more detail in FIG. 2. A first cooling zone 4 is provided between the face of the extruder die 3 and a cooling unit 5. In the cooling zone 4 the extruded lead or core material 6 forms a catenary loop the length of which is controlled by means of proximity sensors 7. The sensors 6 determine that the height of the loop is between carefully controlled limits. The distance between the cooling unit 5 and the face of the extruder die 3 is adjustably set to maintain the length of the catenary loop.

The cooling unit 5 is also conventional and may be a six hole cooler attached to a compressor operating at 10 bar. The cooled, by now rigid, core material is fed from the cooler to a crosshead die 8 where the core material is coated with the sheath or coating material. The cooling unit 5 and the crosshead die 8 are separated by a region 9 typically 1 m long. The core material is rigid in the region 9 after being cooled to room temperature in the cooling unit 5.

A coating extruder 10 is attached to an inlet 11 of the crosshead die 8. The coating extruder 10 may also be of conventional type.

The extrudate from the crosshead die 8 undergoes cooling in a second cooling zone 12 during which the coating material undergoes expansion due to a foaming or blowing agent added to the coating material in the coating extruder 10. The blowing agent may be, for example EPICOR (TM). The length of the extrudate 6 in the cooling zone 12 is also maintained in an manner similar to that in the cooling zone 4. The core material is heated by the sheath material and is no longer rigid when leaving the die 8.

The extrudate is fed into a calibrator 13 which sizes the extrudate to the correct diameter. After a further cooling stage in a cooling tank 14 the product is fed by a conventional haul off device (not shown) to a conventional cutting device (not shown) which cuts the cooled extrudate into suitable lengths.

Figure 2:
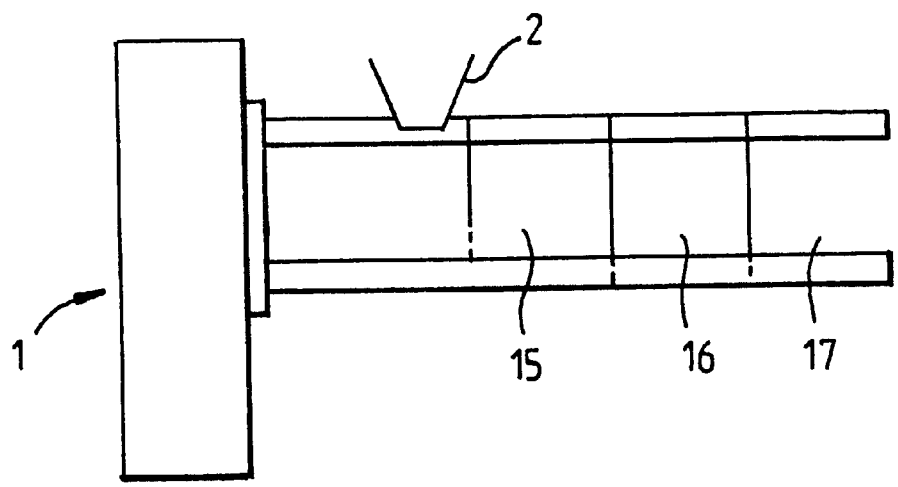
FIG. 2 is a schematic drawing of a core material extruder according to one embodiment.

FIG. 2 shows the core extruder 1 in a schematic manner. The extruder may be any conventional extruder, for example a single or double worm extruder. In the present embodiment, the core material is fed in the form of pellets through hopper 2 by means of a suitable dosing device, for example a conventional gravimetric dosage installation. In the present embodiment, the material supplied has already been compounded with suitable additives such as graphite, adhesives, gliding substances and fillers. However, the extruder 1 may be of a modular form and may comprise one or more mixing, kneading degasification stations as well as further loading stations for additives.

Regions 15, 16 and 17 are heating and cooling stages; region 15 heats the material beyond the melting point of the core material, for example to 200° C. In regions 16 and 17 the temperature is progressively reduced so that the material contracts slightly before entering the extruder die discussed in more detail below with reference to FIG. 3.

Figure 3:
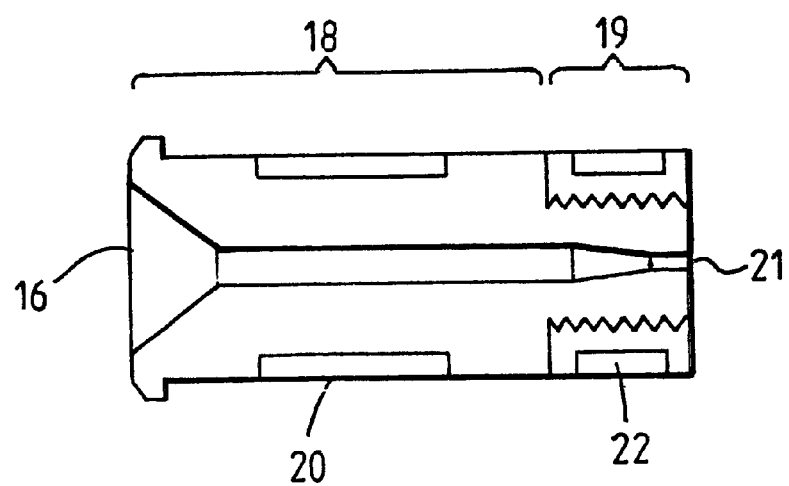
FIG. 3 is a cross sectional view of the core extruder die shown in FIG. 1 shown in more detail.

The extruder core die is shown in FIG. 3 which is attached to the outlet of the extruder 1 at its face 16 so as to communicate with the outlet of the extruder 1. The core die has two zones 18 and 19. The internal diameters of zones 18 and 19 reduce in stages as shown in the figure. The inlet of zone 18 has a typical diameter of 32 mm which reduces to 10 mm. Zone 18 is typically 95 mm long and has heaters 20 to maintain the temperature of the core material at 125° C. Zone 19 is typically 20 mm long and has a rounded taper which reduces from 10 mm to say 2.5 mm at the die outlet 21. Heaters 22 maintain the temperature at say 155° C. so that the core material is soft as it exits the extruder 1.

The purpose of the decreasing and increasing temperature profiles is to ensure proper gliding of the extrudate giving a higher throughput and importantly a better surface finish to the core which improves the strength of the core material.

The distance between the outlet 21 of the core die and the cooling unit 5 is typically 1.5 m and the length of the molten core material is maintained between set limits by proximity sensors 7 which are connected to a control device. The control device varies the throughput of the system in a known manner by increasing or decreasing the haul off rates and the dosage rate into the core extruder 1. The length of the core material suspended between the extruder 1 and the cooling device 5 is important to the cooling process. If the core material cools too much it will become rigid before entering the cooling device 5 and may break.

The proximity sensors 7 may take any convenient form, for example two photo detectors and corresponding light or laser sources arranged opposite to the respective sensor at the minimum and maximum heights as shown schematically in FIG. 1.

The distance between the outlet of the cooling device 5 and the inlet of the crosshead die 8 is typically 1 m. Whilst in any particular embodiment the cooling method may vary it is important that the core material extrudate 6 is straight and rigid as it enters the crosshead die 8.

The assembly 8 is a large diameter die and has central passage of greater diameter (e.g. 3.2 mm) along its length than the extruded core material 6. The crosshead die may be a two part crosshead and die assembly formed of a male and female section in keeping with common design practice. One section (female) has a threaded wall adapted be connected to a threaded conduit adapter (not shown) to provide the necessary communication with an extruder 10 which is used to feed molten sheath material through inlet 11. Another section (male) of the assembly 8 holds the die plates, which may be held in place by a machine screw arrangement such that the distance between the plates can be varied. Alternatively, as the sections are also replaceable, a new male section can be substituted with a wider die spacing. The male and female sections are secured together by means of a machine screw arrangement and an annular passage is formed between them. The sheath material flows along the annular passage from the inlet under pressure from the extruder 10 and the temperature is maintained at e.g. 150° C. by a heater 25.

In a typical prior art crosshead die assembly for extrusion of pencils as described in U.S. Pat. No. 3,993,408, a cone insert having a central passage communicating with and forming a continuation of the central passage of the crosshead die assembly 8. The annular passage of the prior art therefore ends in a conical portion extending into and between the die plates.

The extrudate from the die 5 is typically ⅔ of the cross-sectional diameter (e.g. 7.3 mm) of the calibrator 13. The sheath material is mixed with a blowing agent in the extruder and expands over time in the cooling zone 12. The blowing agent is an endothermic blowing agent. The length of the extrudate in the cooling zone 12 is, therefore, also regulated by proximity sensors 7 and a control device in similar manner to the cooling zone 4. The distance between the die face 27 and the calibrator 13 is typically 0.75 m.

As the sheath material expands in the cooling zone 12, good interfacial adhesion between the sheath and the core is assured. The problem of assuring good adhesion between core and sheath is a crucial problem to be solved when manufacturing pencils.

Expansion of the sheath material is completed in the cooling zone 12 and the extrudate is then sized by the calibrator 13 before further cooling in a cooling tank 14. Finally the extrudate is cut into pencil lengths by a conventional cutting machine.

The apparatus and technique of the present invention allow unconventional materials to be used to manufacture pencils having all the required properties such as ease of sharpening.

It is a feature of the present invention that the apparatus and method provided by the invention allow the use of materials such as recycled medium impact polstyrene which could not previously have been used. In the case of both the core and sheath materials it is necessary to mix the recycled materials with other material to improve the properties.

Instead of adding graphite to produce a traditional pencil, the apparatus and method can also be used to produce pencils of various colours by adding different additives.

Whilst an embodiment of the invention has been specifically described, modification and variations will suggest themselves to those skilled in the art without departing from the scope of the invention as defined in the appended claims.

What is claimed is:

1. Apparatus for manufacturing pencils, comprising a core material extruder, a sheath material extruder, a crosshead and die assembly for coating sheath material onto the core material, and means for sizing extrudate from the crosshead die, cooling means between the core material extruder and the crosshead die, the core material extruder being spaced from the cooling means by a predetermined distance to provide a cooling zone in which the extruded core material sags and is allowed to cool at ambient temperature, means for maintaining the length of the sagging extruded core material between a minimum and a maximum length, the cooling means feeding cooled and rigid core material to the crosshead die in a straight line, the extrudate from the crosshead die sagging between the crosshead die and the sizing means, and means maintaining the length of the extrudate between the crosshead die and the sizing means between a minimum and a maximum length.

2. A method for extruding pencils having a core and a sheath, comprising loading the core and sheath materials into respective extruders, cooling extruded core material in a cooler downstream of the core material extruder, establishing a sag in the form of a catenary curve in the extruded core material between the core material extruder and the cooler, cooling the core material in the cooler to form a rigid straight extent of core material that is fed in a straight line to the sheath material extruder, forming in the sheath material extruder a sheathed core, and cooling and sizing the sheathed core to a predetermined diameter.

3. A method as claimed in claim 2, wherein the sheathed core sags upon leaving the sheath material extruder, and controlling the degree of sag of the sheathed core material.

* * * * *